Dec. 10, 1935.  L. J. CLAYTON  2,023,665
METHOD AND MEANS FOR CONTINUOUS VULCANIZING OF RUBBER GOODS
Filed Jan. 24, 1934  2 Sheets-Sheet 1
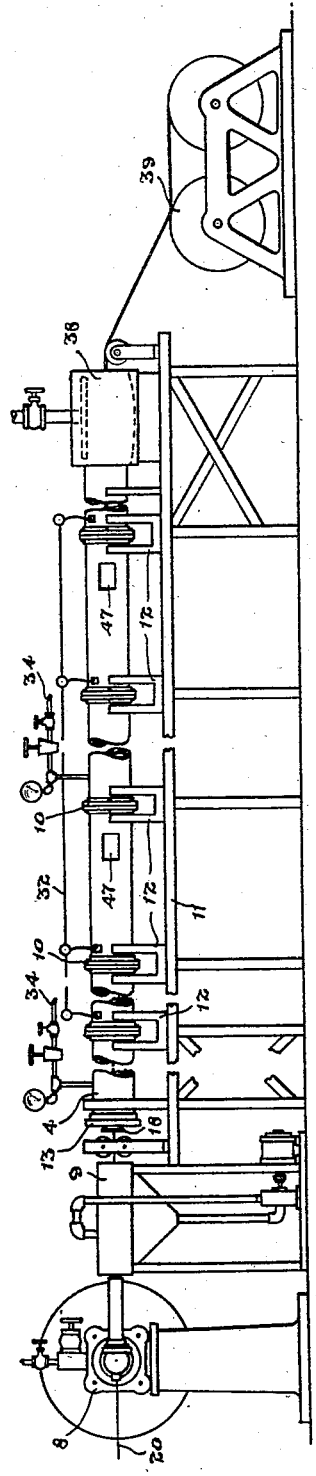
Inventor.
Lewis J. Clayton.

Dec. 10, 1935.   L. J. CLAYTON   2,023,665
METHOD AND MEANS FOR CONTINUOUS VULCANIZING OF RUBBER GOODS
Filed Jan. 24, 1934   2 Sheets-Sheet 2

Inventor.
Lewis J. Clayton.

Patented Dec. 10, 1935

2,023,665

UNITED STATES PATENT OFFICE 2,023,665

METHOD AND MEANS FOR CONTINUOUS VULCANIZING OF RUBBER GOODS

Lewis J. Clayton, Toronto, Ontario, Canada, assignor to Viceroy Manufacturing Company, Limited, Toronto, Ontario, Canada Application January 24, 1934, Serial No. 708,067

7 Claims. (Cl. 18—6)

The principal objects of this invention are to devise a method of continuous vulcanization of rubber goods under independently variable pressures and temperatures thereby enabling the adjustment of such variables to accomplish the desired vulcanization in the minimum of time and to provide a device which will permit of the application of temperatures which will most effectively accomplish the vulcanization of the rubber under low pressure conditions and which will be very economical to operate.

Further important objects are to devise a machine of simple and inexpensive construction having a minimum of moving and wearing parts and in which the parts are easily accessible for inspection, adjustment or repair.

A still further object is to provide a machine which may be readily adapted for the handling of a variety of sizes and shapes of goods of continuous form and which will accomplish the uniform vulcanization of the goods passed therethrough.

The principal feature of the method consists in passing the vulcanizable goods through sealed chambers subject to variable pressures and through separately controllable heat zones arranged in said chambers.

The principal features of the apparatus consist in the novel construction of means for sealing the ends of the vulcanizing chambers around the progressively moving goods being produced and in the novel construction and arrangement of the heating means within said vulcanizing chambers whereby heat may be applied in controlled temperatures in separate zones.

In the drawings, Figure 1 is an elevational view of a machine assembly constructed in accordance with this invention.

Figure 2 is an enlarged longitudinal sectional view of a portion of the vulcanizing chamber and one of the zone heating devices.

Figure 3 is a cross section through the vulcanizing chamber taken on the line 3—3 of Figure 2.

This invention has been devised to facilitate the manufacture of rubber-covered wire or rubber goods which may be produced in continuous strip form. Such goods may be preformed and wound on reels from which they are unwound to pass through the vulcanizing chambers, or the strip goods may be formed in an extruder and carried directly through the vulcanizer.

Figure 4:
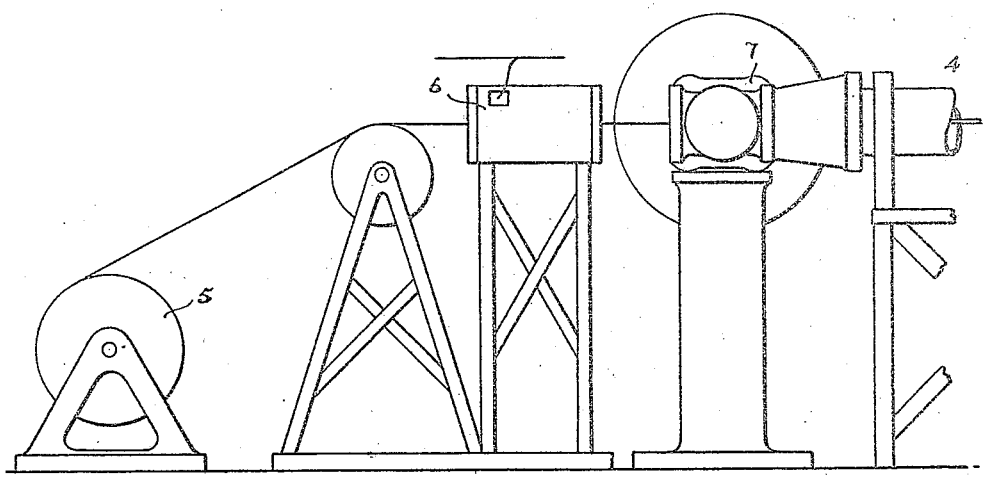
Figure 4 is an enlarged elevational detail showing the arrangement of feeding, drying and forming device assembled at one end of the vulcanizing device.
Figure 5:
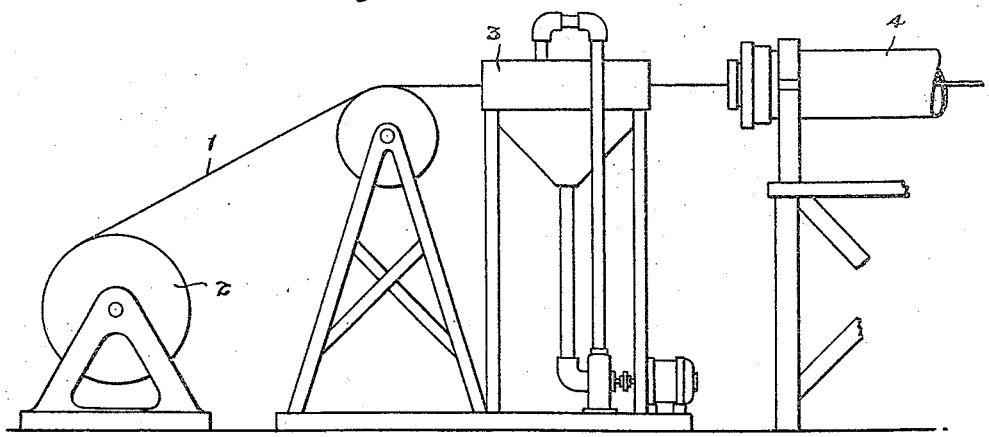
Figure 5 is a view similar to Figure 4 showing a slightly different arrangement of feed in which the formed goods are mounted on a reel and drawn through a lubricating chamber.

Two different forms of apparatus are shown in Figures 5 and 4 respectively, illustrating the unwinding (Fig. 5) of the rubber strip I from a reel 2 to pass through a suitable lubricating device 3 before passing into the vulcanizer 4.

In the form illustrated in Figure 4, the wire to be covered is mounted on a reel 5 and the wire passes through a drying device 6 into the extruder 7 which is directly connected with the vulcanizer.

In the form illustrated in Figure 1 the wire to be covered passes through the extruder 8 to the lubricator 9 and then to the vulcanizer 4. The vulcanizer 4 is in the form of a tubular casing which may be of any desired cross sectional shape though it is preferably cylindrical. This tubular casing is preferably formed of a plurality of separable sections each provided with flange rings 10 at the ends which are suitably bolted together.

A suitable frame or bench II is provided to support the vulcanizer and upon this bench are mounted a plurality of brackets or chairs 12 upon which the tubular sections of the vulcanizer rest. One end of the vulcanizer is rigidly mounted and the remaining portion is free to move longitudinally upon the chairs 12 as the casing expands and contracts under variable conditions of applied heat.

At each end of the vulcanizing casing and secured to the end flange rings is a plate 13 which closes the end of the casing. This plate is formed with a central orifice 14 which corresponds closely to the shape of the article to be vulcanized, that is, it is round or oblong or square in accordance with the cross sectional shape of the article to be vulcanized and of slightly larger dimensions.

A recess 15 is provided in the outer side of the plate 13 surrounding the central orifice, and in this recess is embedded the packing disc 16 which is of a soft, compressible, elastic material such as rubber and is provided with a central orifice 17 of the shape and dimensions of the cross section of the article to be vulcanized. The outer face of the disc 16 is of flattened conical form and said disc is held in position by a plate 18 having its inner face recessed in conical form substantially the shape of the outer surface of the disc.

The plate 18 is secured in position by bolts 19, and by tightening these bolts and squeezing the compressible disc the area of the central orifice will be reduced so that the wall of the orifice will retain a constant pressure contact upon the material or strip being fed therethrough.

As is illustrated in Figure 1 the wire 20 is fed through the extruder which forms the rubber around the same in a uniform coating. The coated wire passes through the lubricator 9 being coated with a suitable lubricating substance such as soapstone, soap or the like, which will cause the rubber-covered wire to slip freely through the orifice 17 in the packing disc. The rubber-covered wire extends throughout the length of the vulcanizing casing and passes out through a similar packing disc at the opposite end.

A pressure may be applied to the interior of the vulcanizing casing and it is found in practice that a pressure slightly above atmosphere serves to prevent bubbling or porosity in the rubber being vulcanized.

Within the tubular vulcanizer are arranged a plurality of heat elements. These are of a particular formation, each being formed of a length of metal tubing 21 preferably highly polished both inside and out. These metal tubes are supported within the casing 4 preferably by set screw 22 at the sides and 23 at the bottom, while the top is held in position by spring arms 24.

Discs 25 are held in place by rings 26 at the ends of the tubes 21 and said discs are provided with central orifices 27 to permit the member 1 to pass therethrough.

A plurality of insulator rods 28 are supported in parallel arrangement between the discs 25 and around these is spirally wound a heating coil 29. Flexible conductor wires 30 connect with the heating coil and lead to a plug 31 secured in the wall of the vulcanizer tube 4, which plug is provided with outside terminals to connect with suitable electric conduits 32.

A suitable grid or screen 33 preferably formed of a wire mesh screening is arranged inside of and spaced from the insulator rods, the ends thereof being preferably secured in the orifices 27 in the discs 25. This screening is formed with dead black surfaces and forms a heat-diffusing member surrounding the vulcanizable member 1.

It will be understood that the heater coil 9 may be in the form of a single or a multiple coil with suitable connections so that the heat supplied thereby may be modified either by connecting one or more of the coils with the electric current supply or by the use of a rheostat outside of the vulcanizer. The radiant heat rays emanating from the heater coil flow directly inward applying heat to the vulcanizable member 1 through the diffuser screen and the heat rays travelling outward are reflected back by the highly polished or white metal surface of the tube 21 so that the maximum heating value of the heater coil is applied within the space enclosed by the tube 21 and its end discs 25. This enables a high temperature to be applied within this area enclosed by the tube 21 with very little of the heat escaping into the atmosphere surrounding the tube 21 within the outer casing 4.

This enclosed arrangement very effectively limits convection currents within the vulcanizer.

For certain classes of work it is desirable that a pressure slightly greater than atmosphere be applied during vulcanization and a conduit 34 controlled by suitable valves is secured in the casing 21 and leads from a suitable source of pressure supply which may be air or any desirable form of gas. This pressure completely fills the vulcanizer casing 4 and may be utilized to advantage in the prevention of friction between the vulcanizable member 1 in passing through the packing disc by permitting a slight leakage so that a thin film of air will escape therearound. This will minimize friction and prevent undue heating of the packing.

Where it is desired to have the packing fit close, however this pressure may be allowed to enter behind the packing and it will tend to cause the rubber packing to squeeze inwardly to maintain a close seal around the vulcanizable member. The vulcanizable member may be supported at intervals throughout the length of the vulcanizer by means of rollers 35 which are preferably mounted on pivotal arms 36 and adjusted by means of screws 37 extending through the casing.

Only one of the heater elements is shown in the drawings in detail in Figure 2, but as is indicated in Figure 1, the vulcanizer casing is formed of several tubular lengths, and it is preferred to have a suitable heater element in each of these lengths. Electric supply wires are shown in Figure 1 connected with plugs in each of these tubular lengths.

It is preferable to arrange packing glands at each end of the vulcanizer as has been described, and at one end of the vulcanizer is arranged a cooling chamber 38 which may be provided with a spray device to rapidly cool the vulcanized goods as they are drawn from the vulcanizer.

Any suitable form of capstan device 39 may be arranged to draw the material through the vulcanizer.

Figures 6, 7, 8, 9:
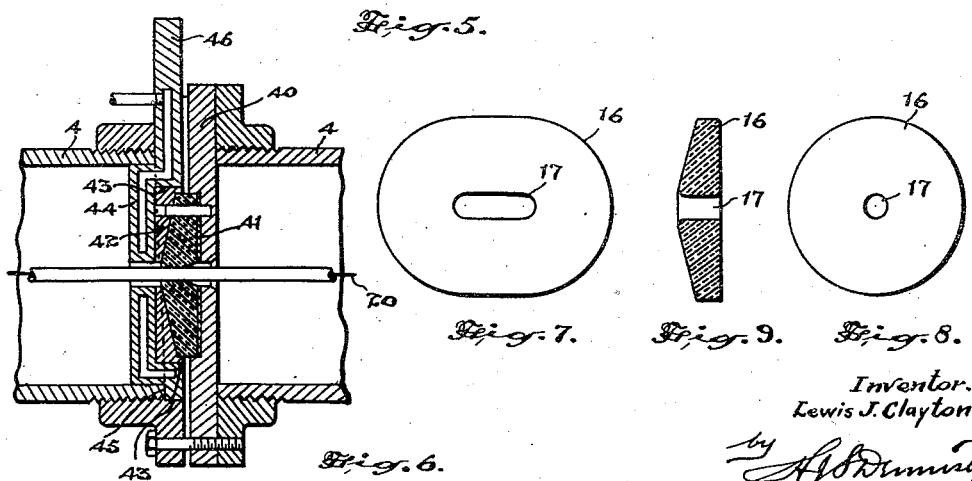
Figure 6 is an enlarged sectional detail of a packing gland to be arranged between a pair of vulcanizing chambers where a difference of pressures is desired.
Figures 7 and 8 are plan views of two different forms of packing members.
Figure 9 is a cross section of either of said packing glands.

It may be found desirable to apply variable temperatures and pressures throughout the length of the vulcanizer and when such result is required a packing disc may be arranged between any of the tubular lengths of the vulcanizer casing 4. Such an arrangement is illustrated in Figure 6 wherein a metal disc 40 is recessed to carry the compressible packing disc 41 similar to the disc 16. A metal disc 42 with a concaved inner face is arranged outside of the disc 40 and this disc is mounted within a recess 43 in a member 44 which is rotatably mounted in the adjacent member of the casing 4. This latter member is provided preferably with an eccentric surface 45 abutting the end of the casing so that upon the turning of said member it will squeeze the packing disc to close in the orifice around the vulcanizable member.

The member 44 is provided with an arm 46 which extends through a slot in the casing 4. The member 44 is shown hollow so that a cooling fluid may be circulated therethrough.

Where a separating disc and packing member is used in the manner described, the pressures within the vulcanizing chamber may be varied by arranging separate fluid pressure controls at the section desired.

It will be understood that various cross sectional shapes of vulcanizable strips may be treated in a machine such as described and it may be found desirable to provide heaters with the cross sectional contour of the heat element support arranged in conformance with the shape of the vulcanizable member so that heat will be applied equally throughout its entire area. The means for adjusting the position of the heater element within the vulcanizing casing also assists in setting up the machine so that variations of heat through convection and reflection may be stabilized.

It will be readily appreciated that a machine constructed as described may be readily taken apart; the sections of the vulcanizing chamber 4 may be easily and quickly separated and the heaters readily withdrawn therefrom for repair, adjustment or replacement.

It has been found in practice with a machine of this type that very high temperatures can be applied to the rubber goods being treated resulting in very quickly raising them to a proper vulcanizing temperature, and the device is particularly adaptable for the manufacture of rubber goods where such treatment in vulcanizing is desired, that is, where the article is subjected to several different temperatures, the goods being subjected to a particular maximum temperature for a definite period, and further, the device lends itself to zoning treatment in respect to both temperature and pressure, both being independently variable in each zone. That is to say, as the article passes progressively through each successive section of the elongated tunnel-like chamber past the sealing means separating the one section from the other it may be subjected successively to a different pressure and temperature in each section or to a uniform temperature and different pressure, as may be required in accordance with the nature of the materials under treatment or the resultant quality desired.

In this way the density of the material may be controlled in stages by passing same through zones of progressively increasing or decreasing pressure. Moreover, it makes possible the initial heat treatment of the material under normal pressure when desired so that the curing may be advanced to a desired stage prior to application of pressure for the remaining portion of the cure, or heat may be applied in successively increasing temperatures to raise the temperature of the article rapidly.

The apparatus has been described as being useful for treating rubber goods under pressure greater than atmosphere and it is equally adaptable for treating during vulcanization at pressures less than atmosphere, it being merely necessary to apply a vacuum to the fluid pressure supply instead of a pressure, and when a vacuum is applied the external air pressure will hold the packing discs into close sealing association with the strip of vulcanizable material being drawn therethrough. This will be found valuable where porous rubber or rubber of low density is desired, or where an expansive influence is required during heat treatment.

In the rubber industry hot air or hot gas pressure vulcanizing methods have long been used, but such methods require the maintenance of a circulation of the air or gas and it is practically impossible to maintain uniform heat distribution under such conditions. Further, the thermal efficiency of such equipment is extremely low due to the low thermal capacity of the air or gas used.

In the present method no attempt is made to heat the air or gas used in a pressure medium and the construction described is intended to effectively suppress circulation and convection.

The substantial enclosure of the heating areas, that is, within the tubes 21, prevents the escape of any material quantity of heat therefrom into the outer enclosed space, consequently variation of temperature from air movement is eliminated, and the air confined in the heater section is raised to a high temperature and acts as a heat reservoir to stabilize against momentary variations in heater temperature.

With certain classes of goods it may be found desirable to observe the condition of the goods passing through the vulcanizer and the transparent areas 47 may be provided in the casing 4.

It will be appeciated from this description that the construction of a device such as described is extremely simple, is very flexible; any desired number of heater elements may be grouped for continuous treatment for a desired period, and these may be readily altered as occasion may demand.

What I claim as my invention is:—

1. A device for the continuous vulcanization of rubber goods comprising a tubular chamber having sealing means at the ends to permit the entry and exit of the rubber goods, a plurality of tubular reflector members spaced apart and arranged in said chamber, discs supported in the ends of said reflector tubes, electric heater elements suspended between said discs within said tubular reflectors, and means for controlling the pressure in said sealed chamber separate from the temperature control.

2. A device for the continuous vulcanization of rubber goods comprising a tubular chamber having sealing co-operation with the goods at axially spaced points, a plurality of electric radiant heaters arranged in said chamber between the points of sealing and producing local zones of concentrated radiant heat through which the goods are passed and means for controlling the pressure in said chamber separate from the temperature.

3. A device for the continuous vulcanization of rubber goods comprising a tubular chamber adapted to contain a medium under pressure, a plurality of tubular reflector members arranged in said chamber at axially spaced points through which the rubber goods is adapted to pass, sealing means at the ends of said chamber permitting the sealed entry and exit of the rubber goods, electric heater elements arranged in axially spaced units within said tubular reflector members between the reflective wall thereof and the rubber goods, and means for controlling the prevailing pressure in said sealed chamber separate from the temperature control.

4. A method of continuous vulcanization of rubber goods, comprising passing said goods successively through sealed chambers, maintaining independent pressures in each of said chambers, applying heat to said goods in passage through said respective sealed chambers and individually controlling the temperature of the heat application in said respective chambers and independent of the prevailing pressure condition in said respective chambers.

5. A device for the continuous vulcanization of rubber goods comprising a tubular chamber through which the goods is passed and having sealing co-operation with the goods at the ends, sealing means dividing said chamber intermediate of its length into separate independent sections, means for separately regulating pressure in each section of the divided chamber relative to the remaining section or sections, and means for applying heat in said respective sealed sections independent of the pressure therein and independent of the temperature of heat application in the remaining section or sections, whereby a versatile "zoning" control is permitted which may be readily adapted to requirements.

6. A method of providing a controlled accelerated rate of vulcanizing of continuous strip form products of uniform cross section, comprising arranging a tubular reflector within an elongated variable pressure tunnel, moving said continuous strip through said tunnel at a regulated rate subject to the pressure prevailing therein and concentrically of the said tubular reflector therein, causing radiant heat units to be generated within said tubular reflector and to be concentrated by reflection toward the axis of the reflector occupied by said travelling strip, and controlling the prevailing pressure on said strip independent of the heat application within a range extending from a partial vacuum to a pressure greater than atmosphere, whereby the quality of the strip product may be accurately regulated throughout its length.

7. A device for the rapid controlled vulcanization of continuous strip products comprising an elongated tunnel-like chamber, a highly reflective tubular element supported within said tunnel chamber, means generating radiant heat rays within said reflective tubular element and creating thereby a concentrated zone of radiant and reflected heat rays in the axial region of the said tubular reflector, means advancing said continuous strip product axially through said tubular reflector at a regulated rate in the said concentrated zone of radiant and reflected heat rays, means providing a sealed entry and exit of said continuous strip product, and means controlling the prevailing pressure condition in said chamber independent of the intensity of the applied heat to regulate the texture of the product under treatment, said pressure condition being variable from a partial vacuum to any desirable pressure greater than atmosphere.

LEWIS J. CLAYTON.